(12) United States Patent
Kim

(10) Patent No.: US 10,916,745 B2
(45) Date of Patent: Feb. 9, 2021

(54) FLEXIBLE BATTERY

(71) Applicant: SAMSUNG SDI CO., LTD., Yongin-si (KR)

(72) Inventor: Hyunchul Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 155 days.

(21) Appl. No.: 14/955,191

(22) Filed: Dec. 1, 2015

(65) Prior Publication Data

US 2017/0040582 A1 Feb. 9, 2017

(30) Foreign Application Priority Data

Aug. 5, 2015 (KR) .................. 10-2015-0110587

(51) Int. Cl.
| | |
|---|---|
| *H01M 2/10* | (2006.01) |
| *H01M 2/20* | (2006.01) |
| *H01M 10/0585* | (2010.01) |
| *H01M 10/04* | (2006.01) |
| *H01M 6/40* | (2006.01) |
| *H01M 2/08* | (2006.01) |
| *H01M 2/02* | (2006.01) |
| *H01M 6/46* | (2006.01) |
| *H01M 10/0525* | (2010.01) |
| *H01M 2/16* | (2006.01) |

(52) U.S. Cl.
CPC ....... *H01M 2/1061* (2013.01); *H01M 2/0275* (2013.01); *H01M 2/08* (2013.01); *H01M 2/204* (2013.01); *H01M 6/40* (2013.01); *H01M 6/46* (2013.01); *H01M 10/0436* (2013.01); *H01M 10/0525* (2013.01); *H01M 10/0585* (2013.01); *H01M 2/1673* (2013.01); *H01M 2200/103* (2013.01); *H01M 2220/30* (2013.01)

(58) Field of Classification Search
CPC .... H01M 2/1061; H01M 2/0275; H01M 2/08; H01M 6/40; H01M 6/46; H01M 10/0436; H01M 10/0585
See application file for complete search history.

(56) References Cited

U.S. PATENT DOCUMENTS

| | | | | |
|---|---|---|---|---|
| 5,503,948 A | * | 4/1996 | MacKay ............. | H01M 2/22 29/623.1 |
| 5,567,543 A | * | 10/1996 | Constable .......... | G03B 17/32 396/301 |

(Continued)

FOREIGN PATENT DOCUMENTS

| | | |
|---|---|---|
| CN | 103959480 A | 7/2014 |
| CN | 203690355 U | 7/2014 |

(Continued)

OTHER PUBLICATIONS

Extended European Search Report dated Nov. 17, 2016.

(Continued)

*Primary Examiner* — Ula C Ruddock
*Assistant Examiner* — Thomas H. Parsons
(74) *Attorney, Agent, or Firm* — Lee IP Law, P.C.

(57) ABSTRACT

A flexible battery includes a first substrate, a second substrate, and a first unit cell and a second unit cell arranged between the first substrate and the second substrate in lengthwise directions of the first substrate and the second substrate, the first and second unit cells being electrically connected to each other.

20 Claims, 6 Drawing Sheets

(56) References Cited

U.S. PATENT DOCUMENTS

| | | | |
|---|---|---|---|
| 6,528,204 B1 | 3/2003 | Hikmet et al. | |
| 6,884,547 B2 * | 4/2005 | Mori ................... | H01M 2/145 29/623.1 |
| 8,142,923 B2 * | 3/2012 | Emura ................ | H01M 2/1673 429/162 |
| 9,343,716 B2 | 5/2016 | Rothkopf et al. | |
| 9,991,492 B2 * | 6/2018 | Roumi ................ | H01M 2/1673 |
| 2010/0330411 A1 | 12/2010 | Nam et al. | |
| 2013/0171490 A1 | 7/2013 | Rothkopf et al. | |
| 2015/0064521 A1 * | 3/2015 | Watanabe ........... | H01M 2/1077 429/72 |
| 2016/0260945 A1 | 9/2016 | Rothkopf et al. | |

FOREIGN PATENT DOCUMENTS

| | | | | |
|---|---|---|---|---|
| DE | 10214875 A1 * | 10/2003 | ......... | G06K 19/0702 |
| FR | 2838242 A1 | 10/2003 | | |
| JP | H05-54895 A | 3/1993 | | |
| JP | 2003-510768 A | 3/2003 | | |
| JP | 2015-507814 A | 3/2015 | | |
| KR | 10-2012-0006730 A | 1/2012 | | |
| KR | 10-2013-0140551 A | 12/2013 | | |
| WO | WO2009105896 | * | 9/2009 | |

OTHER PUBLICATIONS

Chinese Office action dated May 6, 2020.
Office Action dated Jul. 30, 2019 of the Japanese Patent Application No. 2015-207137.
Chinese Office action dated Dec. 17, 2020.

* cited by examiner

FLEXIBLE BATTERY

CROSS-REFERENCE TO RELATED APPLICATION

Korean Patent Application No. 10-2015-0110587, filed on Aug. 5, 2015, in the Korean Intellectual Property Office, and entitled: "Flexible Battery," is incorporated by reference herein in its entirety.

BACKGROUND

1. Field

Embodiments relate to a flexible battery.

2. Description of the Related Art

Recently, with the development of lightweight and small-sized mobile electronic devices, there is an increasing demand for miniaturized and lightweight batteries for supplying power to the mobile electronic devices for both driving use and back-up use. In addition, it is also necessary to efficiently use a receiving space in an electronic device. To cope with these requirements, lithium ion secondary batteries, which have a high energy density or output density and are rechargeable, are often used.

SUMMARY

According to an aspect of the present disclosure, there is provided a flexible battery including a first substrate, a second substrate, and a first unit cell and a second unit cell arranged between the first substrate and the second substrate in lengthwise directions of the first substrate and the second substrate, wherein the first and second unit cells are electrically connected to each other.

The flexible battery may further include sealing members formed along peripheries between the first substrate and the second substrate.

The sealing members may be formed between the first and second unit cells.

The first and second unit cells may be directly electrically connected or indirectly electrically connected via a conductive adhesive layer.

Each of the first and second unit cells may include a first conductive pattern formed on the first substrate, a first active material layer coated on the first conductive pattern, a second conductive pattern formed on the second substrate, a second active material layer coated on the second conductive pattern, and a separator interposed between the first active material layer and the second active material layer, wherein the first and second active material layers face each other.

The flexible battery may further include electrical connector parts electrically connecting the first conductive pattern of the first unit cell and the second conductive pattern of the second unit cell to each other.

The flexible battery may further include sealing members formed on exterior sides of the electrical connector parts.

Each of the electrical connector parts may include a protrusion formed on the first conductive pattern or the second conductive pattern, or a conductive adhesive layer interposed between the first conductive pattern and the second conductive pattern.

The first conductive pattern of the first unit cell may have a first side, the second conductive pattern of the second unit cell may have a second side, and the first side and the second side may be entirely electrically connected to each other.

The first conductive pattern of the first unit cell may have a first side, the second conductive pattern of the second unit cell may have a second side, and some regions of the first side and the second side may be electrically connected to each other in forms of points.

BRIEF DESCRIPTION OF THE DRAWINGS

Features will become more apparent to those of skill in the art by describing in detail exemplary embodiments with reference to the attached drawings, in which.

DETAILED DESCRIPTION

Figure 1A:
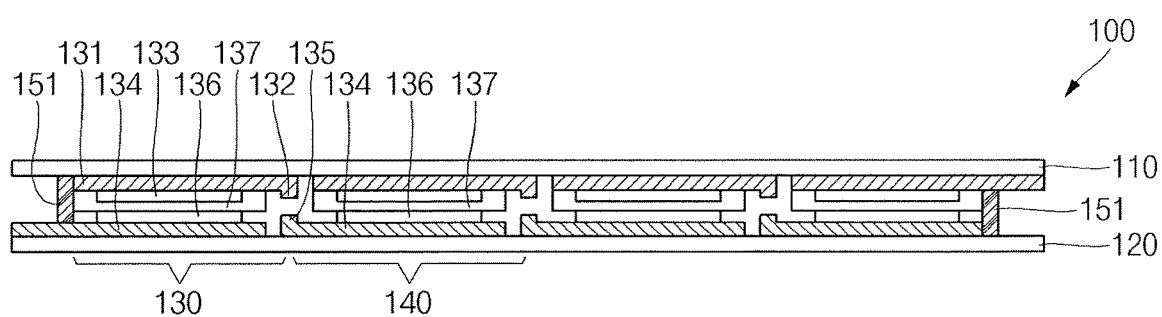
FIG. 1A illustrates a cross-sectional view of unit cells of a flexible battery according to an embodiment to yet be electrically connected.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer (i.e., element) or element is referred to as being "on" or "connected to" another layer or substrate, it can be directly on or connected to the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. In addition, the terminology used herein is for the purpose of describing particular embodiments only and is not intended to be limiting thereof. As used herein, the singular forms are intended to include the plural forms as well, unless the context clearly indicates otherwise. It will be further understood that the ten is "comprises" or "include" and/or "comprising" or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer, and/or section from another. Thus, for example, a first member, a first element, a first region, a first layer and/or a first section discussed below could be termed a second member, a second element, a second region, a second layer and/or a second section without departing from the teachings.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below.

In addition, the term "separator" used herein includes a separator commonly used for a liquid electrolyte battery using a liquid electrolyte having little affinity to the separator. Further, the term "separator" used herein includes an intrinsic solid polymer electrolyte and/or a gel solid polymer electrolyte, in which an electrolyte is firmly bound to a separator, so that the electrolyte and the separator should be interpreted as being identical with each other. Therefore, the meaning of the separator should be defined as having a meaning that is consistent with its meaning in the context of the present disclosure.

Figure 1B:
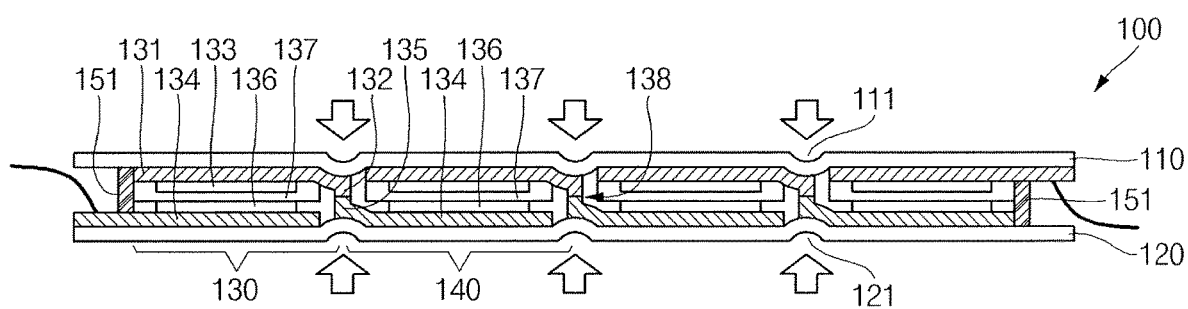
FIG. 1B illustrates a cross-sectional view of electrically connected unit cells in a flexible battery according to an embodiment.
Figure 1C:
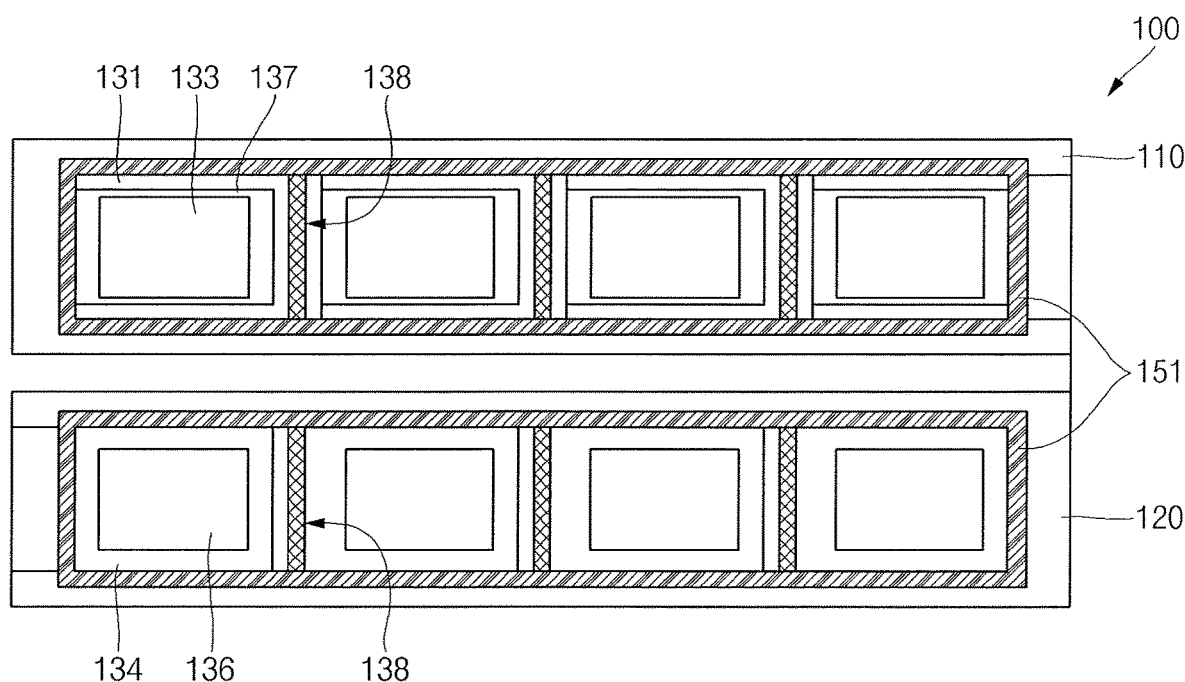
FIG. 1C illustrates a plan view of first and second substrates of the flexible battery in FIG. 1A.

FIG. 1A is a cross-sectional view illustrating a state in which unit cells of a flexible battery 100 according to an embodiment are yet to be electrically connected, and FIG. 1B is a cross-sectional view illustrating a state in which the unit cells are electrically connected. FIG. 1C is a plan view illustrating first and second substrates (110 and 120) of the flexible battery 100 illustrated in FIG. 1A.

As illustrated in FIGS. 1 and 2, the flexible battery 100 according to an embodiment may include a first substrate 110, a second substrate 120, and a first unit cell 130 and a second unit cell 140 horizontally arranged between the first and second substrates 110 and 120, and electrically connected to each other. In addition, the flexible battery 100 according to an embodiment may further include sealing members 151 for protecting the first and second unit cells 130 and 140 formed between the first and second substrates 110 and 120 from external environments.

Each of the first and second substrates 110 and 120 is shaped of a, e.g., rectangular, panel and has a predetermined thickness, a predetermined length, and a predetermined width. As an example, each of the first and second substrates 110 and 120 may have a thickness in a range of about 10 µm to about 1,000 µm, and a length and a width in a range of about 10 mm to about 10,000 mm, but embodiments are not limited thereto.

Each of the first and second substrates 110 and 120 may be made of a plastic film used at a higher temperature than, e.g., polypropylene (PP), polyvinyl chloride (PVC), polystyrene (PS) or high-density polyethylene (HDPE) used at a temperature lower than about 100° C. For example, the first and second substrates 110 and 120 may be made of at least one of poly carbonate (PC), polyethylene terephthalate (PET), polyethylene naphthalate (PEN), polyethersulfone (PES), polyetherimide (PEI), PAR, poly(phenylene sulfide (PPS), liquid-crystal polymer (LCP), polyether ether ketone (PEEK), polytetrafluoroethylene (PTFE), polyimide (PI) and equivalents thereof, used at a temperature higher than about 100° C., but embodiments are not limited thereto.

In some cases, each of the first and second substrates 110 and 120 may further include an internally formed metal thin film made of, e.g., aluminum, copper or iron.

The first unit cell 130 and the second unit cell 140 may be arranged between the first and second substrates 110 and 120. For example, the first unit cell 130 and the second unit cell 140 may be arranged in lengthwise directions of the first and second substrates 110 and 120 or in a horizontal direction, and may be configured to be directly or indirectly electrically connected to each other. The flexible battery 100 may include more unit cells than the first and second unit cells 130 and 140 illustrated herein. However, for a better understanding of the embodiments, the following description will focus on the first and second unit cells 130 and 140 and the relationship of electrical connection therebetween by way of a representative example.

Each of the first and second unit cells 130 and 140 includes a first conductive pattern 131 formed on the first substrate 110, a first active material layer 133 coated on the first conductive pattern 131, a second conductive pattern 134 formed on the second substrate 120, a second active material layer 136 coated on the second conductive pattern 134, and a separator 137 interposed between the first active material layer 133 and the second active material layer 136. The first active material layer 133 and the second active material layer 136 face each other.

For example, the first conductive pattern 131 may be formed by coating copper, nickel or an alloy thereof on the first substrate 110 by one of, e.g., electroplating, electroless plating, physical vapor deposition (PVD), sputtering, evaporation, chemical vapor deposition (CVD), room temperature deposition in vacuum, aerosol deposition and equivalents thereof. In addition, the first conductive pattern 131 may be in the form of a thin film, a lath, a punched metal, or a net. In order to implement the flexible battery 100 as a thin film battery, a thickness of the first conductive pattern 131 may be smaller than, e.g., 20 µm.

The first active material layer 133 may be coated on the first conductive pattern 131. The first active material layer 133 may vary according to the kind of battery manufactured, but is not particularly limited. For example, in a case of manufacturing a lithium secondary battery, any material that is capable of doping and undoping lithium ions, e.g., a hardly graphitizable carbon-based material or a graphite-like carbon material, may be used as the first active material. In detail, the first active material layer 133 may be a carbonaceous material, including an organic polymer compound sintered product, carbon fiber, or activated carbon, prepared by sintering pyrolyzed carbons, cokes, e.g., pitch cokes, needle cokes or petroleum cokes, graphite, glass-like carbons, phenol resin, furan resin, etc. at an appropriate temperature, and carbonizing the same. In addition, examples of the material capable of doping and undoping lithium ions may include a polymer, e.g., polyacetylene or polypyrrole, or an oxide, e.g., $SnO_2$. When the first active material layer 133 is formed using the active material described above, any suitable conductive agent or binder may be further added.

The first active material layer 133 may be formed by a general coating method, e.g., a coating method with a doctor blade, die coating, gravure coating, spray coating, electrostatic coating, or bar coating. Further, a coating thickness of the first active material layer 133 may be appropriately selected according to a target thickness. After the coating, a general drying process, e.g., hot air drying, infrared (IR) drying, drying under reduced pressure, or drying by induction heating, may be performed. Further, an inert gas atmosphere, e.g., an argon gas atmosphere or a nitrogen gas atmosphere, air, or vacuum may be provided as an atmosphere for the drying. Further, a thickness of the first active material layer 133 to be formed may be in a range of about 0.1 µm to about 1,000 µm, e.g., in a range of about 0.1 µm to about 300 µm.

The second conductive pattern 134 and the second active material layer 136 are formed in a substantially the same manner as the first conductive pattern 131 and the first active material layer 133, and the following description will focus on differences.

The second conductive pattern 134 may be made of, e.g., aluminum, titanium or an alloy thereof. In addition, the second conductive pattern 134 may be in the form of a thin film, a lath, a punched metal, or a net. In order to implement the flexible battery 100 as a thin film battery, a thickness of the second conductive pattern 134 may be smaller than, e.g., 20 µm.

The second active material layer 136 used may vary according to the kind of battery manufactured, and embodiments are not limited thereto. For example, in a case of manufacturing a lithium battery or a lithium ion battery, any material that is capable of intercalating and deintercalating lithium ions can be used as the second active material layer 136, but is not particularly limited. In detail, the first active material may include a metal sulfide or an oxide not containing lithium, e.g., $TiS_2$, $MoS_2$, $NbSe_2$, or $V_2O_5$, or a lithium composite oxide represented by a general formula $Li_xMO_2$, where M is one or more transition metals, and generally $0.05 \leq X \leq 1.10$ according to the charged or discharged state of the battery. Here, the transition metal M may be, e.g., Co, Ni, or Mn. Specific examples of the lithium composite oxide may include, e.g., $LiCO_2$, $LiNiO_2$, $LiNYCo_1-YO_2$ (o<Y<1), or $LiMn_2O_4$. The lithium composite oxide may generate a high voltage and has a superior energy density.

In particular, lithium cobalt oxide or lithium nickel oxide may be used as the second active material layer 136 because a high voltage and a high volume density can be attained and good cycle life characteristics are exhibited. The lithium composite oxide can be prepared by pulverizing and mixing carbonate, acetate, oxide or hydride of lithium, carbonate, acetate, oxide or hydride of cobalt, manganese or nickel according to a desired composition ratio, and sintering the mixture at a temperature in a range of about 600° C. to about 1000° C. in an oxygen atmosphere. In addition, when an electrode is formed using the second active material layer 136, any suitable conductive agent or binder may be further added.

The separator 137 may be interposed between the first active material layer 133 and the second active material layer 136. As an example, the separator 137 may be formed to completely cover the first active material layer 133, e.g., cover all exposed surfaces of the first active material layer 133. The separator 137 may include, but is not particularly limited to, a porous polyolefin based separator or a ceramic separator. For example, the polyolefin based separator may have a three-layered cylindrical pore structure of polypropylene (PP)/polyethylene (PE)/PP, or a single-layered net pore structure of PP or PE. In another example, the ceramic separator may be obtained by coating a ceramic material on a surface of the polyolefin based separator or coating a ceramic material on a surface of a non-woven fabric. The ceramic material may be, e.g., aluminum oxide.

In addition, a polymer electrolyte layer may be used as the separator 137. In this case, the polymer electrolyte layer may completely surround only the first active material layer 133. The polymer electrolyte layer may include, but is not particularly limited to, a polymer solid electrolyte having a film separating characteristic, or a gel electrolyte having a plasticizer added thereto.

When the separator 137 does not include the polymer electrolyte layer, a separate electrolyte may be used, e.g., a lithium salt dissolved in an aprotic solvent or a mixed solvent having two or more kinds of these solvents. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(CxF_{2x+1}SO_2)$ $(CyF_{2y+1}SO_2)$ where, x and y are natural numbers, LiCl, Lil, or a mixture thereof. Examples of the aprotic solvent may include propylene carbonate, ethylene carbonate, butylene carbonate, benzonitrile, acetonitrile, tetrahydrofuran, 2-methyl tetrahydrofuran, γ-butyrolactone, dioxolane, 4-methyl dioxolane, N,N-dimethylformamide, dimethylacetamide, dimethylsulfoxide, dioxane, 1,2-dimethoxyethane, sulforane, dichloroethane, chlorobenzene, nitrobenzene, dimethyl carbonate, methylether carbonate, diethyl carbonate, methylpropyl carbonate, methylisopropyl carbonate, ethylpropyl carbonate, dipropyl carbonate, diisopropyl carbonate, dibutyl carbonate, diethylene glycol, dimethylether, or a mixture thereof.

Meanwhile, the first conductive pattern 131 of the first unit cell 130 and the second conductive pattern 134 of the second unit cell 140, which are adjacent to each other, may be directly or indirectly electrically connected to each other. That is to say, the first unit cell 130 and the second unit cell 140 may be electrically connected to each other in series and/or in parallel. For example, the first conductive pattern 131 of the first unit cell 130 formed on the first substrate 110 and the second conductive pattern 134 of the second unit cell 140 formed on the second substrate 120 may be ultrasonically welded to each other. Here, since one end of the first conductive pattern 131 and one end of the second conductive pattern 134 are compressed with respect to each other, dimples 111 and 121 having a predetermined depth may be formed on the first substrate 110 and the second substrate 120 (FIG. 1B).

In detail, in order to facilitate the ultrasonic welding, a first protrusion 132 is formed at a first end of the first conductive pattern 131, and a second protrusion 135 is formed at a first end of the second conductive pattern 134. That is, as illustrated in FIG. 1A, the first protrusion 132 is formed only at the first end of the first conductive pattern 131, e.g., so a second end of the first conductive pattern 131 is flat without protrusions, and the second protrusion 135 is formed only at the first end of the second conductive pattern 134 that face the first end of the first conductive pattern 131, e.g., so a second end of the second conductive pattern 134 is flat without protrusions. The first protrusion 132 and the second protrusion 135 may protrude toward each other, and may overlap each other. When the first conductive pattern 131 and the second conductive pattern 134 are compressed with respect to each other, the first and second protrusions 132 and 135 contact each other to be electrically connected to each other. The dimples 111 and 121 are formed in the first substrate 110 and the second substrate 120, respectively, in regions overlapping the connected first and second protrusions 132 and 135.

For example, in order to facilitate the ultrasonic welding, when the first conductive pattern 131 is made of copper and the second conductive pattern 134 is made of aluminum, for example, aluminum is plated on the first conductive pattern 131 or copper is plated on the second conductive pattern 134, followed by being ultrasonically welded to each other. However, embodiments are not limited to the above, e.g., laser welding or resistance welding may also be applied to the embodiments. During laser welding or resistance welding, predetermined regions of the first and second substrates 110 and 120 corresponding to welding regions may be removed.

Further, separate drawing tabs, leads and/or wires may be electrically connected to the first conductive pattern 131 and the second conductive pattern 134 formed on the outermost sides of the first substrate 110 and the second substrate 120 to be used as terminals, which may be connected to an external electronic device and/or a charger.

The sealing members 151 may be formed along peripheries between the first substrate 110 and the second substrate 120, and the first unit cell 130 and the second unit cell 140 are protected from external environments by the sealing members 151. For example, as illustrated in FIG. 1C, one sealing member 151 may be formed on each of the first and second substrates 110 and 120 along a respective periphery, so the respective sealing members 151 may contact each other and combine into a combined sealant between facing first and second substrates 110 and 120. For example, as further illustrated in FIG. 1C, each sealing member 151 on a respective first or second substrates 110 and 120 may extend continuously along an entire perimeter of the respective first or second substrates 110 and 120 to define a closed-shaped frame.

When a liquid electrolyte exists with the first and second substrates 110 and 120, it may not leak out through the sealing members 151. The sealing members 151 may be, for example, a hot melt adhesive, e.g., a polyolefin resin, but embodiments are not limited thereto.

For example, as illustrated in FIG. 1C, the first substrate 110 may have a roughly rectangular shape, and the first conductive pattern 131, the first active material layer 133, and the separator 137, which are integrally formed as a single body, may be horizontally spaced apart from one another on the first substrate 110. The spaced-apart units may all be positioned at an interior portion defined by the roughly rectangular sealing members 151.

Similarly, the second substrate 120 may also has a roughly rectangular shape, and the second conductive pattern 134 and the second active material layer 136, which are integrally formed as a single body, may be horizontally spaced apart from one another on the second substrate 120. The spaced-apart units may all be positioned at an interior portion defined by the roughly rectangular sealing members 151.

As described above, if the sealing members 151 are adhered to each other while the first substrate 110 and the second substrate 120 are disposed to face each other, the first and second substrates 110 and 120 are integrally formed. That is to say, the first and second unit cells 130 and 140 are completed at an interior portion defined by the first and second substrates 110 and 120.

In addition, as the first conductive pattern 131 of the first unit cell 130 and the second conductive pattern 134 of the second unit cell 140 are ultrasonically welded to each other, the first and second unit cells 130 and 140 are electrically connected to each other. Here, regions where the first conductive pattern 131 of the first unit cell 130 and the second conductive pattern 134 of the second unit cell 140 are electrically connected to each other via respective protrusions are defined as electrical connector parts 138. In other words, the first conductive pattern 131 of the first unit cell 130 includes the first protrusion 132 at its first end, and the second conductive pattern 134 of the second unit cell 140 includes the second protrusion 135 at its first end. The first ends of the first and second conductive patterns 131 and 134 are entirely electrically connected to each other, while forming the electrical connector parts 138.

The first unit cell 130 and the second unit cell 140 do not share an electrolyte but independently have electrolytes. That is, since the first unit cell 130 includes the sealing members 151 on two or three sides and the electrical connector parts 138 on one or two sides, the first unit cell 130 does not share the electrolyte with the second unit cell 140 adjacent thereto, thereby preventing a probability of current leakage from occurring. For example, as illustrated in FIGS. 1B-1C, a leftmost first unit cell 130 includes the sealing member 151 on three sides and the electrical connector parts 138 on one side to define a frame, e.g., completely, surrounding the leftmost first unit cell 130, so the electrolyte surrounding the first unit cell 130 is maintained within the frame surrounding the leftmost first unit cell 130 without penetrating, e.g., leaking, toward the second unit cell 140 adjacent thereto.

Further, according to embodiments, the first active material layer 133, the separator 137, and the second active material layer 136 are mostly surrounded by the first conductive pattern 131 and the second conductive pattern 134. As such, external moisture may not penetrate into the first and second unit cells 130 and 140 through the first and second substrates 110 and 120.

As described above, embodiments provide a cell-module integrated flexible battery 100 in which the first unit cell 130 and the second unit cell 140 are connected in series to each other by 12V or 48V according to the application adopted. In addition, the first unit cell 130 and the second unit cell 140 are perfectly sealed from external environments by the sealing members 151 and the electrical connector parts 138. In addition, according to embodiments, separate bus bars are not required, unlike in the conventional battery in which bus bars are provided outside the battery. Embodiments provide the flexible battery 100 with unit cells electrically connected to each other therein, where the flexible battery 100 may be bent or wound like rolled paper when necessary.

Figure 2A:
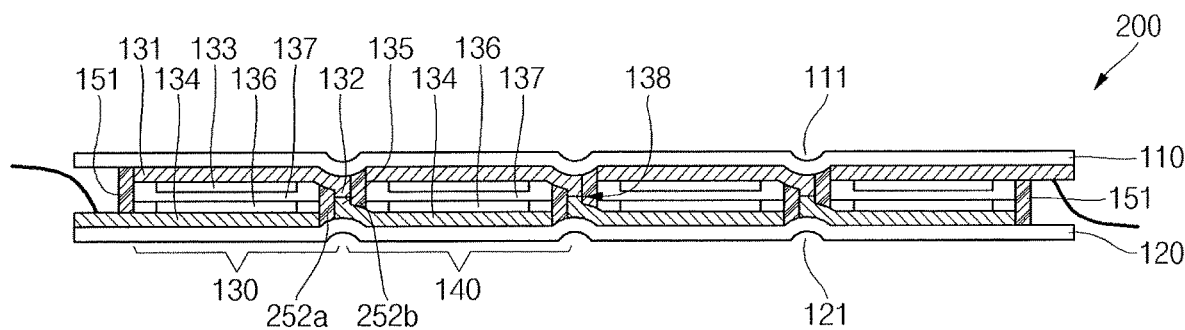
FIG. 2A illustrates a cross-sectional view of a flexible battery according to another embodiment.
Figure 2B:
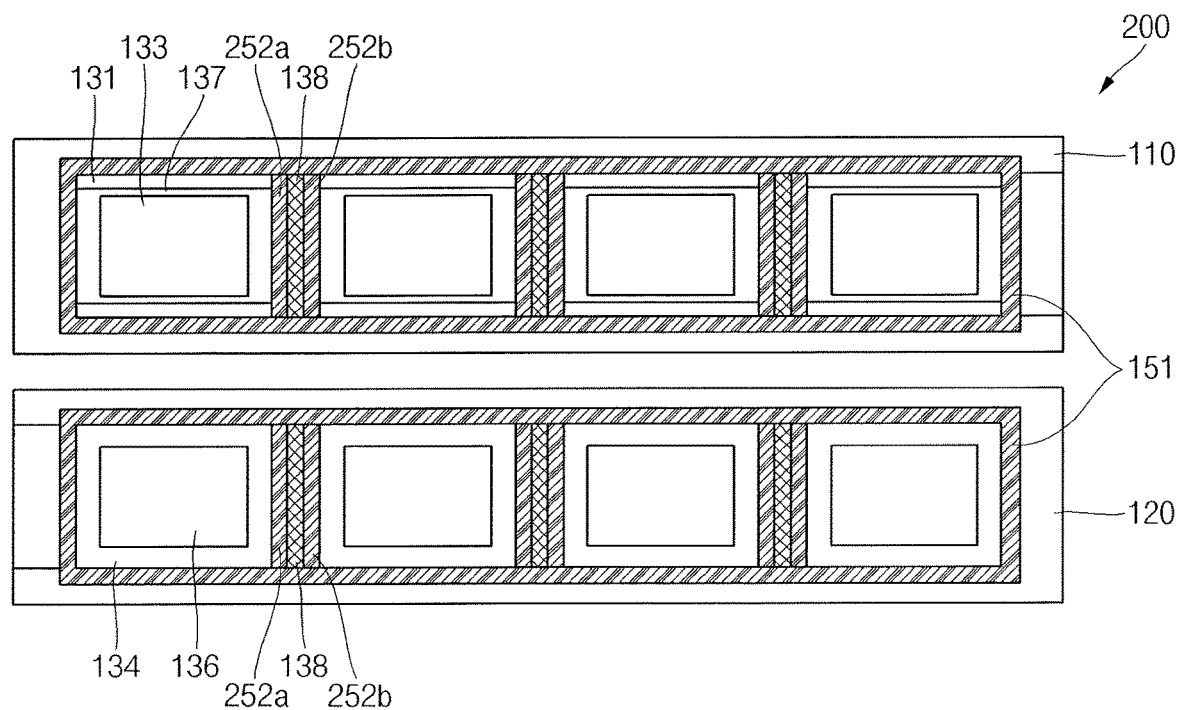
FIG. 2B illustrates a plan view of first and second substrates of the flexible battery illustrated in FIG. 2A.

FIG. 2A is a cross-sectional view illustrating a flexible battery 200 according to another embodiment. FIG. 2B is a plan view illustrating first and second substrates (110 and 120) of the flexible battery 200 illustrated in FIG. 2A. The flexible battery 200 is substantially the same as the flexible battery 100, with the exception of additionally including sealing members 252a and 252b.

As illustrated in FIGS. 2A and 2B, in the flexible battery 200, the sealing members 151 are formed along peripheries between the first and second substrates 110 and 120. In addition, the sealing members 252a and 252b may further be formed in boundary regions between the first unit cell 130 and the second unit cell 140. For example, the sealing members 252a and 252b may be formed on opposite sides of regions where the first conductive pattern 131 of the first unit cell 130 and the second conductive pattern 134 of the second unit cell 140 are connected to each other, e.g., on opposite sides of each electrical connector part 138. Here, the sealing members 252a and 252b are connected to the roughly rectangular sealing members 151 along the peripheries of the first and second substrates 110 and 120. In addition, since the sealing members 252a and 252b come into contact with the separator 137, voids generated in the first unit cell 130 and the second unit cell 140 may be substantially minimized.

Therefore, in the flexible battery 200 according to another embodiment, electrolyte isolation between the first unit cell 130 and the second unit cell 140 may be improved. In addition, the sealing members 252a and 252b surround the electrical connector parts 138, while the first substrate 110 and the second substrate 120 are connected to each other, thereby further improving mechanical strength of the flexible battery 200.

Figure 3:
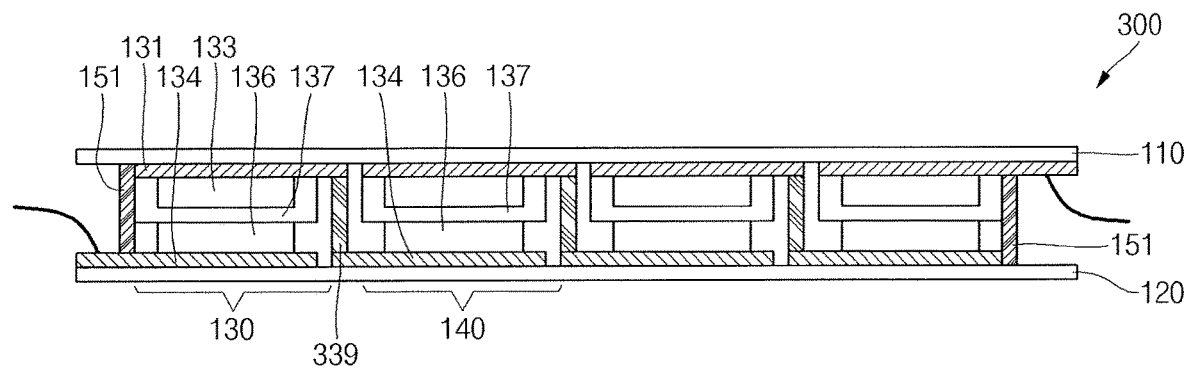
FIG. 3 illustrates a cross-sectional view of a flexible battery according to still another embodiment.

FIG. 3 is a cross-sectional view illustrating a flexible battery 300 according to still another embodiment. The flexible battery 300 is substantially the same as the flexible battery 100, with the exception of including conductive adhesive layer 339.

As illustrated in FIG. 3, in the flexible battery 300, the first conductive pattern 131 of the first unit cell 130 and the second conductive pattern 134 of the second unit cell 140 may be electrically connected to each other via the separate conductive adhesive layer 339. The conductive adhesive layer 339 may be at least one of an isotropic conductive adhesive (ICA) including a polymer base material and conductive filler particles, an anisotropic conductive paste (ACA) including a thermally curable polymer base material and conductive filler particles, an anisotropic conductive film having a release film attached thereto, and equivalents thereof, but embodiments are not limited thereto. When the conductive adhesive layer 339 is wound on a reel in the form of a film, the release film may allow the conductive adhesive layer 339 to be easily handled so as not to be adhered to the reel.

The conductive adhesive layer 339, e.g., ICA or ACA, may be locally coated on the first conductive pattern 131 of the first unit cell 130 and/or the second conductive pattern 134 of the second unit cell 140 through stencil printing, followed by curing the same through a reflow process or a thermal compression process, thereby electrically connecting the first conductive pattern 131 of the first unit cell 130 and the second conductive pattern 134 of the second unit cell 140 to each other. The conductive adhesive layer 339 may facilitate an electrical connection between the first conductive pattern 131 of the first unit cell 130 and the second conductive pattern 134 of the second unit cell 140. In addition, even if the first active material layer 133 and/or the second active material layer 136 are formed relatively thickly, the electrical connection between the first and second conductive patterns 131 and 134 may be facilitated.

The conductive adhesive layer 339 may be formed on the entire surface of the first side of the first conductive pattern 131 of the first unit cell 130 and on the entire surface of the second side of the second conductive pattern 134 of the second unit cell 140, so that the first side and the second side are entirely electrically connected to each other. Here, the sealing members 151 may be formed along the peripheries of the first substrate 110 and the second substrate 120.

Therefore, the first unit cell 130 and the second unit cell 140 may not share an electrolyte, as the conductive adhesive layer 339 and the sealing members 151 separate therebetween. As such, electrolyte leakage may be prevented or substantially minimized.

Figure 4:
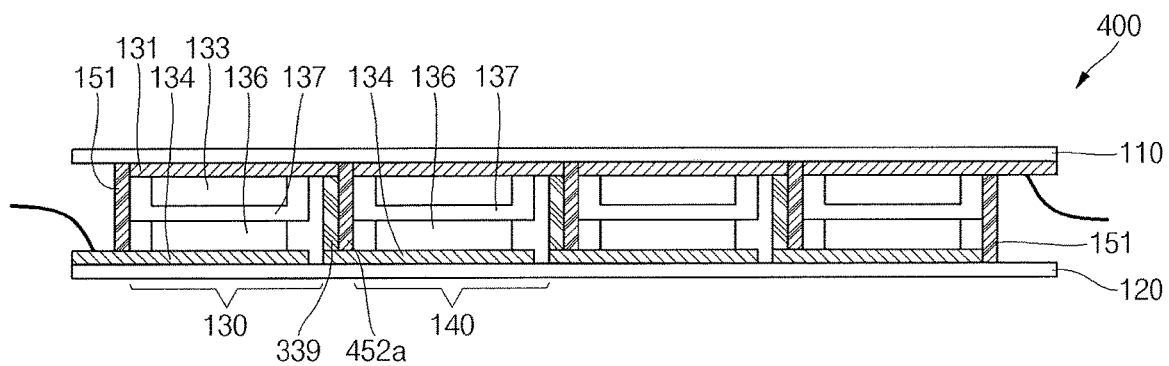
FIG. 4 illustrates a cross-sectional view of a flexible battery according to still another embodiment.

FIG. 4 is a cross-sectional view illustrating a flexible battery 400 according to still another embodiment. The flexible battery 400 is substantially the same as the flexible battery 300, with the exception of additionally including a sealing member.

As illustrated in FIG. 4, the flexible battery 400 according to still another embodiment may further include a sealing member 452a formed on at least one side of the conductive adhesive layer 339. That is, the sealing member 452a is formed on at least one side of the conductive adhesive layer 339 and has a top end adhered to the first substrate 110 and a bottom end adhered to the second conductive pattern 134. Therefore, the flexible battery 400 according to still another embodiment may ensure electrolyte isolation between the first and second unit cells 130 and 140, and may further increase a coupling force between the first substrate 110 and the second substrate 120.

Figure 5:
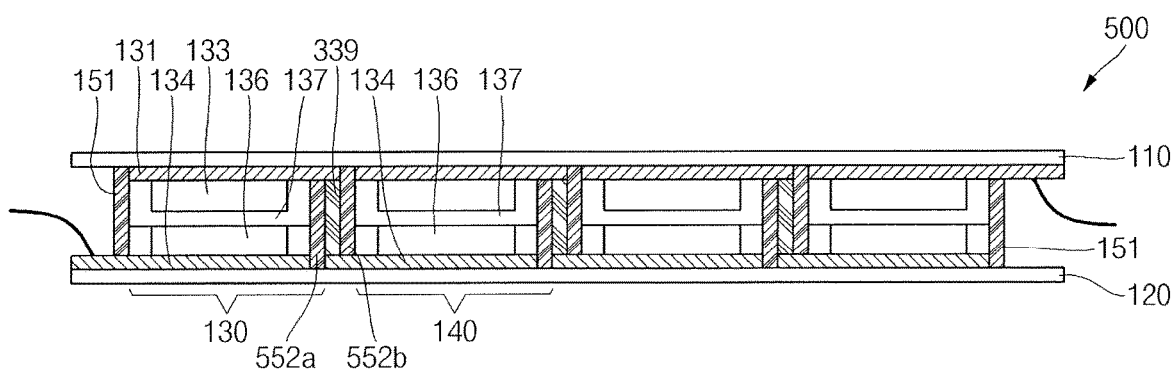
FIG. 5 illustrates a cross-sectional view of a flexible battery according to still another embodiment.

FIG. 5 is a cross-sectional view illustrating a flexible battery 500 according to still another embodiment. The flexible battery 500 is substantially the same as the flexible battery 300, with the exception of including additional sealing members.

As illustrated in FIG. 5, the flexible battery 500 according to still another embodiment may further include the sealing members 552a and 552b formed on opposite sides of the conductive adhesive layer 339. That is, the sealing members 552a and 552b are formed on opposite sides of the conductive adhesive layer 339 and have top ends adhered to the first conductive pattern 131 and/or the first substrate 110 and bottom ends adhered to the second substrate 120 and/or the second conductive pattern 134. Therefore, the flexible battery 500 according to still another embodiment may ensure electrolyte isolation between the first and second unit cells 130 and 140, and may further increase a coupling force between the first substrate 110 and the second substrate 120.

Figure 6:
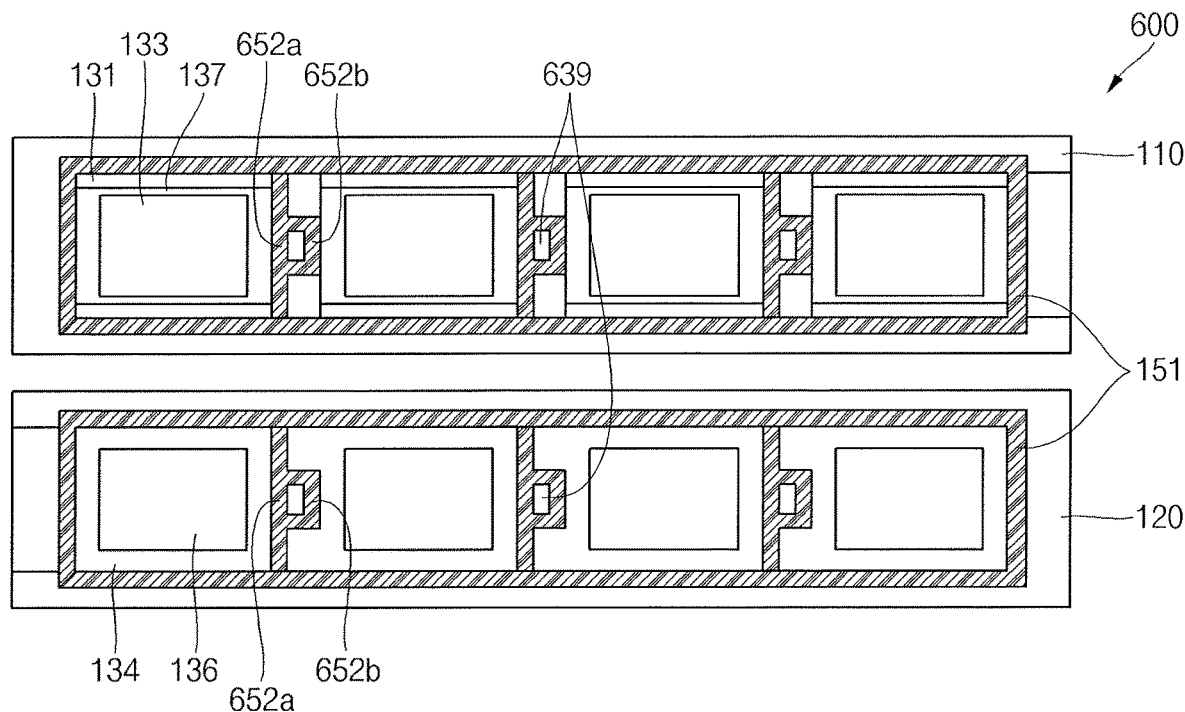
FIG. 6 illustrates a plan view of first and second substrates of a flexible battery according to still another embodiment.

FIG. 6 is a plan view illustrating first and second substrates (110 and 120) of a flexible battery 600 according to still another embodiment. The embodiment illustrated in FIG. 6 may also be applied to other embodiments.

As illustrated in FIG. 6, in the flexible battery 600, the first conductive pattern 131 of the first unit cell 130 has a first side, and the second conductive pattern 134 of the second unit cell 140 has a second side. Here, some regions of the first side and the second side may be electrically connected in forms of points (e.g., circles, triangles, rectangles, or the like). That is, the first conductive pattern 131 and the second conductive pattern 134 may be directly electrically connected to each other in forms of points, e.g., via a plurality of discontinuous portions, so the electrically connected parts may be defined as the electrical connector parts 138, or may be indirectly electrically connected to each other via a conductive adhesive layer 639. Perimeters of the electrical connector parts 138 and/or the conductive adhesive layer 639 are surrounded by sealing members 652a and 652b, and the first unit cell 130 and the second unit cell 140 are physically separated from each other by the sealing members 652a and 652b.

As described above, since the first unit cell 130 and the second unit cell 140 are electrically connected to each other by the electrical connector parts 138 and/or the conductive adhesive layer 639 in forms of points, the electrical connector parts 138 and/or the conductive adhesive layer 639 may function as fuses. That is, when the first unit cell 130 and/or the second unit cell 140 are over-charged or over-discharged, the electrical connector parts 138 and/or the conductive adhesive layer 639 having relatively small sectional areas may be easily broken by charge current or discharge current. Therefore, the flexible battery 600 is superior in view of safety and reliability. Further, in order to improve fuse performance, the electrical connector parts 138 and/or the conductive adhesive layer 639 may be made of solder with or without lead (Pb).

Figure 7:
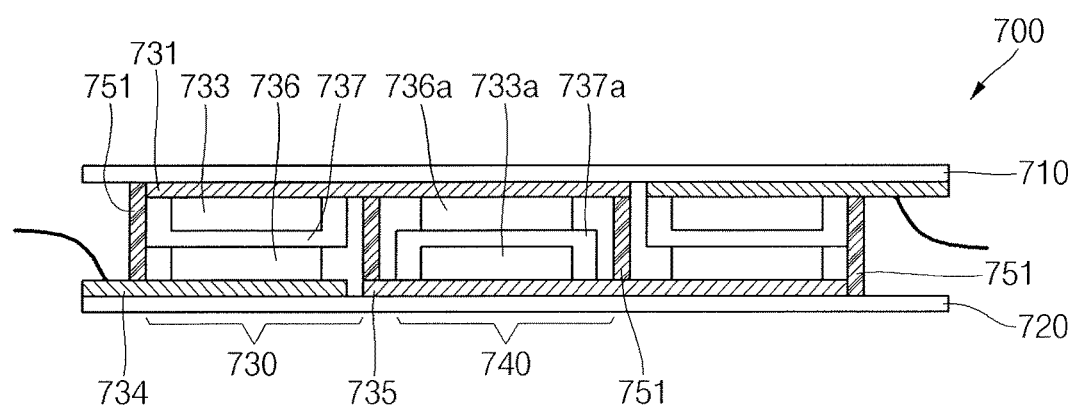
FIG. 7 illustrates a cross-sectional view of a flexible battery according to still another embodiment.

FIG. 7 is a cross-sectional view illustrating a flexible battery 700 according to still another embodiment.

As illustrated in FIG. 7, the flexible battery 700 may include a first substrate 710, a second substrate 720, and a first unit cell 730 and a second unit cell 740 formed between the first substrate 710 and the second substrate 720 to be spaced apart from each other. Here, the first unit cell 730 and the second unit cell 740 share a first conductive pattern 731 formed on the first substrate 710. That is, a first active material layer 733 of the first unit cell 730 is formed on the first conductive pattern 731, and a second active material layer 736*a* of the second unit cell 740 is formed on the first conductive pattern 731 to be spaced apart from the first active material layer 733. Here, the first active material layer 733 may be surrounded by a separator 737.

In addition, a second conductive pattern 734 and a third conductive pattern 735 spaced apart from each other so as to correspond to the first conductive pattern 731 are formed on the second substrate 720. A second active material layer 736 is formed on the second conductive pattern 734, and the second active material layer 736 overlaps the separator 737 and the first active material layer 733, thereby completing the first unit cell 730. In addition, a first active material layer 733*a* is formed on the third conductive pattern 735 and overlaps the second active material layer 736*a*, and the first active material layer 733*a* is covered by a separator 737*a*, thereby completing the second unit cell 740.

That is, the first unit cell 730 includes the first conductive pattern 731, the first active material layer 733, the separator 737, the second active material layer 736, and the second conductive pattern 734. The second unit cell 740 includes the first conductive pattern 731, the second active material layer 736*a*, the separator 737*a*, the first active material layer 733*a*, and the third conductive pattern 735.

Additionally, the first unit cell 730 and the second unit cell 740 are physically separated from each other by the sealing member 751, so that the first unit cell 730 and the second unit cell 740 may not share an electrolyte by the sealing member 751. In addition, the sealing member 751 is also formed on peripheries of the first substrate 710 and the second substrate 720, so that the electrolyte may not leak out. As described above, according to embodiments, the first conductive pattern 731 is shared by the first unit cell 730 and the second unit cell 740, thereby obviating a need for a separate ultrasonic welding process or a separate conductive adhesive layer.

Figure 8:
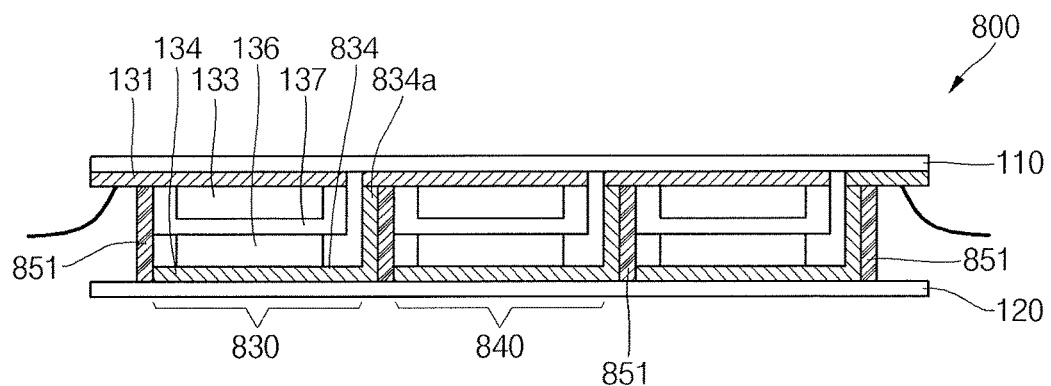
FIG. 8 illustrates a cross-sectional view of a flexible battery according to still another embodiment.

FIG. 8 is a cross-sectional view illustrating a flexible battery 800 according to still another embodiment.

As illustrated in FIG. 8, the flexible battery 800 is configured such that a second conductive pattern 834 of a first unit cell 830 is bent along a sealing member 851, and then electrically connected to a first conductive pattern 831 of a second unit cell 840. Here, the bent region of the second conductive pattern 834 may be defined as a bent portion 834*a*. Therefore, since the first unit cell 830 and the second unit cell 840 are physically separated from each other by the bent portion 834*a* of the second conductive pattern 834 and a sealing member 851, an electrolyte may not be shared by the first unit cell 830 and the second unit cell 840, thereby preventing current from leaking out.

Figure 9:
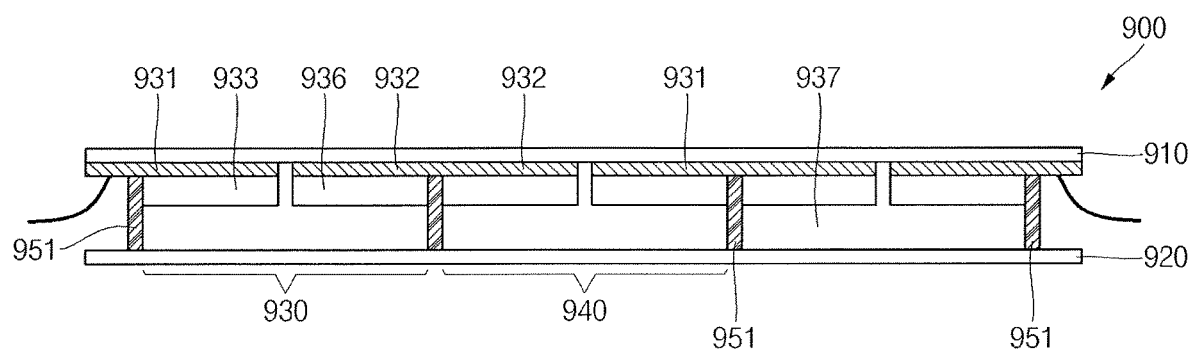
FIG. 9 illustrates a cross-sectional view of a flexible battery according to still another embodiment.

FIG. 9 is a cross-sectional view illustrating a flexible battery 900 according to still another embodiment.

As illustrated in FIG. 9, the flexible battery 900 according to still another embodiment may include a first substrate 910 on which a first conductive pattern 931 and a second conductive pattern 932 spaced apart from each other are formed, and a second substrate 920 on which no conductive pattern is formed. Further, a first active material layer 933 is formed on the first conductive pattern 931 and a second active material layer 936 is formed on the second conductive pattern 932 spaced apart from the first conductive pattern 931. In addition, the first active material layer 933 and the second active material layer 936 are covered by a separator 937. Further, the first active material layer 933 and the second active material layer 936, which are horizontally arranged, are sealed by a sealing member 951, thereby completing a first unit cell 930. Here, the first active material layer 933 is further formed on the second conductive pattern 932 extending via a sealing member 951, and the second active material layer 936 is formed on the first conductive pattern 931 spaced apart from the second conductive pattern 932, thereby completing a second unit cell 940.

As described above, according to embodiments, a plurality of first conductive patterns 931 and a plurality of second conductive patterns 934 are formed only on the first substrate 910, and no conductive pattern may be formed on the second substrate 920. Therefore, the embodiment provides the flexible battery 900 in the form of a thinner film.

Figure 10:
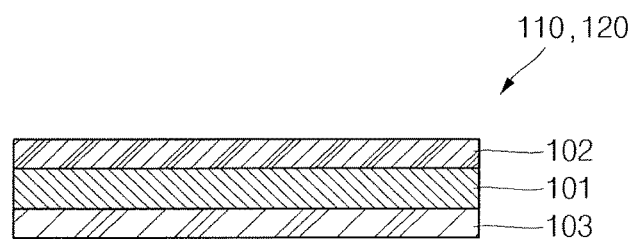
FIG. 10 illustrates a cross-sectional view of an example of a substrate which can be used for a flexible battery according to an embodiment.

FIG. 10 is a cross-sectional view illustrating an example of a substrate which can be used for flexible batteries (100-900) according to embodiments.

As illustrated in FIG. 10, in the flexible batteries (100-900) according to embodiments, the first substrate 110 and/or the second substrate 120 may include a metal thin film 101, and a first insulation layer 102 and a second insulation layer 103 formed on top and bottom surfaces of the metal thin film 101, respectively. The metal thin film 101 may be made of, e.g., aluminum, an aluminum alloy, nickel, a nickel alloy, copper, a copper alloy, iron, or an iron alloy, but embodiments are not limited thereto. In addition, the first and second insulation layers 102 and 103 may be made of at least one of poly carbonate (PC), polyethylene terephthalate (PET), polyethylene naphthalate (PEN), polyethersulfone (PES), polyetherimide (PEI), PAR, poly(phenylene sulfide (PPS), liquid-crystal polymer (LCP), polyether ether ketone (PEEK), polytetrafluoroethylene (PTFE), polyimide (PI) and equivalents thereof. However, embodiments are not limited thereto, e.g., the first substrate 110 and/or the second substrate 120 may include only an insulation layer without a metal thin film.

As described above, since the first and second substrates 110 and 120 include the metal thin film 101 and the first and second insulation layers 102 and 103, it is possible to more efficiently prevent moisture from penetrating into an internal space defined by the first and second substrates 110 and 120. In addition, the flexible batteries 100 to 900 having further enhanced mechanical strength against external impacts can be provided.

By way of summation and review, embodiments provide a flexible battery which is formed in a thin film type and can be easily bent. That is, as described above, a flexible battery according to an embodiment is formed as a thin film by arranging a first unit cell and a second unit cell, each formed as a thin film between a first substrate and a second substrate, in a lengthwise direction or in a horizontal direction, and electrically connecting the first unit cell and the second unit cell in an internal space formed by the first substrate and the second substrate.

In addition, the flexible battery may obviate a need of a bus bar or a connecting bar separately provided outside the battery by electrically connecting, e.g., directly or indirectly, the first unit cell and the second unit cell at an interior portion defined by the first substrate and the second substrate. Further, the flexible battery may prevent the first and second unit cells from sharing an electrolyte or may prevent an electrolyte from leaking out by allowing conductive patterns formed on surfaces of the first substrate and the second substrate to prevent moisture from penetrating into the battery and by allowing electrical connector parts electrically connecting the first unit cell and the second unit cell to physically separate the first unit cell and the second unit cell from each other. Additionally, the flexible battery according to embodiments may prevent an electrolyte from being shared by the first and second unit cells and can improve mechanical robustness by further providing sealing members between the first unit cell and the second unit cell in the first substrate and the second substrate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible battery, comprising:
    a first substrate;
    a second substrate; and
    a first unit cell and a second unit cell arranged between the first substrate and the second substrate in lengthwise directions of the first substrate and the second substrate, the first and second unit cells being electrically connected to each other,
    wherein each of the first and second unit cells includes:
        a first conductive pattern on the first substrate,
        a first active material layer coated on the first conductive pattern,
        a second conductive pattern on the second substrate,
        a second active material layer coated on the second conductive pattern, and
        a separator between the first active material layer and the second active material layer, the first and second active material layers facing each other,
    wherein a single end of the first conductive pattern of the first unit cell extends in a direction oriented away from the first substrate,
    wherein a single end of the second conductive pattern of the second unit cell extends in a direction oriented away from the second substrate, the extending single ends of the first and second conductive patterns contacting each other and being electrically connected to each other,
    wherein the first substrate includes a first dimple overlapping a contact point of the extending single ends of the first and second conductive patterns and having a predetermined depth that is less than a thickness of the first substrate, and
    wherein the second substrate includes a second dimple overlapping the contact point of the extending single ends of the first and second conductive patterns having a predetermined depth that is less than a thickness of the second substrate, the first and second dimples overlapping each other and curving toward each other.

2. The flexible battery as claimed in claim 1, further comprising sealing members along peripheries between the first substrate and the second substrate.

3. The flexible battery as claimed in claim 2, wherein the sealing members are between the first and second unit cells.

4. The flexible battery as claimed in claim 2, wherein the sealing members include first and second sealing members on the first and second substrates, respectively, each of the first and second sealing members extends along an entire combined perimeter of the first and second unit cells.

5. The flexible battery as claimed in claim 4, wherein each of the first and second sealing members has a closed shape, the first and second sealing members being stacked on each other, and the electrically connected ends of the first and second conductive patterns extending between two opposite sides of the closed shape.

6. The flexible battery as claimed in claim 1, wherein the first and second unit cells are directly electrically connected or indirectly electrically connected via a conductive adhesive layer.

7. The flexible battery as claimed in claim 1, further comprising electrical connector parts electrically connecting the first conductive pattern of the first unit cell and the second conductive pattern of the second unit cell to each other.

8. The flexible battery as claimed in claim 7, further comprising sealing members on exterior sides of the electrical connector parts.

9. The flexible battery as claimed in claim 7, wherein each of the electrical connector parts includes a protrusion on the first conductive pattern or on the second conductive pattern, the protrusions on the first and second conductive patterns facing and contacting each other.

10. The flexible battery as claimed in claim 7, wherein each of the electrical connector parts includes a conductive adhesive layer between the first conductive pattern and the second conductive pattern.

11. The flexible battery as claimed in claim 1, wherein the first conductive pattern of the first unit cell has a first side, the second conductive pattern of the second unit cell has a second side, and the first side and the second side are entirely electrically connected to each other.

12. The flexible battery as claimed in claim 1, wherein the first conductive pattern of the first unit cell has a first side, the second conductive pattern of the second unit cell has a second side, and some regions of the first side and the second side are electrically connected to each other in forms of points.

13. The flexible battery as claimed in claim 1, further comprising a sealing member between the first and second substrates and surrounding the first and second unit cells, an electrical connection between the first and second unit cells extends between two opposite sides of the sealing member.

14. The flexible battery as claimed in claim 1, wherein the first and second unit cells have separate electrolytes.

15. The flexible battery as claimed in claim 1, wherein the first and second unit cells are electrically connected to each other only via the extending single ends of the first and second conductive patterns.

16. The flexible battery as claimed in claim 1, wherein the separator of the first unit cell is separated from the separator of the second unit cell.

17. The flexible battery as claimed in claim 1, wherein the extending single ends of the first and second conductive patterns that extend away from the first and second substrates are inside an interior of the flexible battery.

18. The flexible battery as claimed in claim 1, wherein:
the first and second unit cells have lateral sides facing each other, and
the extending single ends of the first and second conductive patterns that extend away from the first and second substrates extend along the lateral sides of the first and second unit cells and completely overlap the lateral sides of the first and second unit cells.

19. The flexible battery as claimed in claim 1, wherein the extending single ends of the first and second conductive patterns span the width of the first unit cell to seal an edge of the first unit cell.

20. A flexible battery, comprising:
a first substrate;
a second substrate; and
a first unit cell and a second unit cell arranged between the first substrate and the second substrate in lengthwise directions of the first substrate and the second substrate, the first and second unit cells being electrically connected to each other,
wherein each of the first and second unit cells includes:
a first conductive pattern on the first substrate,
a first active material layer coated on the first conductive pattern,
a second conductive pattern on the second substrate,
a second active material layer coated on the second conductive pattern, and
a separator between the first active material layer and the second active material layer, the first and second active material layers facing each other,
wherein the separator directly contacts and completely covers surfaces of the first active material layer, and the separator exposes at least an edge of the first conductive pattern,
wherein a single end of the first conductive pattern of the first unit cell extends in a direction oriented away from the first substrate and a single end of the second conductive pattern of the second unit cell extends in a direction oriented away from the second substrate, the extending single ends of the first and second conductive patterns contacting each other and being electrically connected to each other,
wherein the first substrate includes a first dimple overlapping a contact point of the extending single ends of the first and second conductive patterns and having a predetermined depth that is less than a thickness of the first substrate, and
wherein the second substrate includes a second dimple overlapping the contact point of the extending single ends of the first and second conductive patterns and having a predetermined depth that is less than a thickness of the second substrate, the first and second dimples overlapping each other and curving toward each other.

* * * * *